United States Patent [19]
Baker et al.

[11] 3,811,405
[45] May 21, 1974

[54] THERMOPLASTIC DISPENSER SYSTEM

[75] Inventors: Robert G. Baker, Avon; Alan B. Reighard, Bay Village, both of Ohio

[73] Assignee: Nordson Corporation, Amherst, Ohio

[22] Filed: July 7, 1972

[21] Appl. No.: 269,595

Related U.S. Application Data
[63] Continuation-in-part of Ser. No. 194,862, Nov. 2, 1971.

[52] U.S. Cl............... 118/2, 118/12, 118/41 D, 222/146 HE
[51] Int. Cl................................ B31b 1/62
[58] Field of Search............. 118/202, 410, 411, 12, 118/8, 2; 401/1; 222/146 R, 146 HE; 137/517

[56] References Cited
UNITED STATES PATENTS
| | | | |
|---|---|---|---|
| 2,831,214 | 4/1958 | Eyles | 222/146 HE |
| 3,712,264 | 1/1973 | Verhoeven | 118/411 X |
| 3,327,680 | 6/1967 | Talbot | 118/411 X |

*Primary Examiner*—Robert B. Reeves
*Assistant Examiner*—Thomas E. Kocovsky
*Attorney, Agent, or Firm*—Wood, Herron and Evans

[57] ABSTRACT

A reciprocating ram type of thermoplastic material dispensing system which includes a hopper from which solid material is fed in small batches into a pressure chamber in front of a reciprocating ram. On the forward stroke of the ram, the solid material is forced through a melting chamber and subsequently supplied in molten form to a dispensing gun. The system includes a pressure regulator in the molten material flow stream to maintain an even pressure of the material at the dispensing gun. It also includes a control circuit for cycling the ram in synchronization with insertion and removal of workpieces or products adjacent the nozzle of the gun. An interlock switch is provided in the control circuit to prevent too frequent recycling of the ram and consequent choking of the system.

14 Claims, 7 Drawing Figures

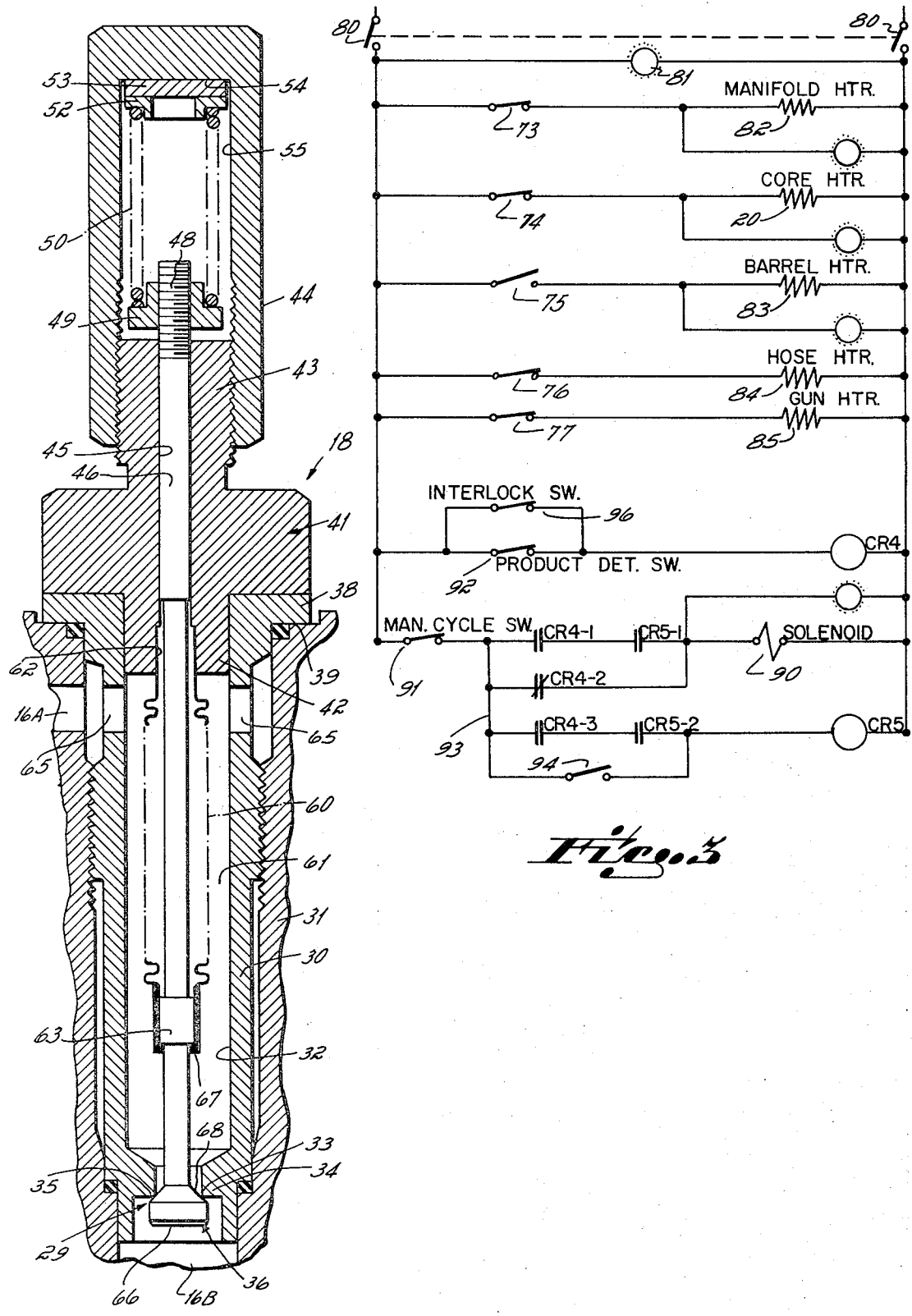

ern from the dispensing gun. It has therefore been one
THERMOPLASTIC DISPENSER SYSTEM This application is a continuation-in-part of application Ser. No. 194,862, filed Nov. 2, 1971, for "Thermoplastic Dispenser System."

This invention relates to a system for dispensing thermoplastic materials and particularly to a system for dispensing so-called "high performance" hot melt adhesives. More specifically, the invention relates to a dispensing system in which solid thermoplastic or hot melt material is melted in small charges or batches and is then supplied in molten form to a dispensing gun so that the quantity of molten material is maintained at a minimum between the point at which it is melted and the dispensing nozzle of the gun.

Thermoplastic adhesives or so-called "hot melt" adhesives, are now commonly used for bonding numerous diverse materials. Primarily, however, hot melts are used for sealing packages where the high speed setting time of the hot melt material may be used to advantage. More recently, though, there has been a great deal of interest in the use of hot melts for product assembly, as for example, in the assembly of automobiles, electronics, electrical equipment, appliances, electrical components, furniture, aircraft subassemblies, and metal-to-metal bonds. In very few product assembly applications, though, can the same hot melt adhesives be used as have heretofore been commonly used for packaging. Usually, product assembly requires that the adhesive have a higher cohesive strength or better surface wetability or a wider in-use temperature range or resistance to a wider variety of chemicals or all of these things than has been required for packaging. In other words, the tolerances for product assembly hot melt are much more critical than for packaging.

For these reasons the adhesives which are presently under development or are already developed and under consideration for product assembly have many different characteristics than earlier packaging type hot melts. These new hot melt adhesives have been labeled "high performance" and are usually polyesters, hydroxyvinyl resins, polyamids, etc. They have many of the desirable properties needed for these high performance applications. Negatively, though, these high performance hot melt materials exhibit highly unstable characteristics at application temperatures, much higher melting and application temperatures than have heretofore been required for the application of so-called packaging type hot melts, and generally higher viscosity. These negative characteristics have for the most part limited if not precluded the use of these high performance materials in many applications, generally because of the lack of any equipment to apply the adhesive to a substrate.

In copending application Ser. No. 194,862, of which this application is a continuation-in-part, there is disclosed a system for melting only that quantity of material which is required at the gun and for maintaining a minimum pool of molten material in the system. That system operates upon the principle of recycling a reciprocating plunger to charge solid thermoplastic material into a melting zone each time that a product or workpiece is inserted beneath the dispensing gun. The system is operable upon the back stroke of the plunger to accept a charge of solid material in front of the piston and upon the forward stroke to feed the charge through a melting zone and into the dispensing gun. In this way only as material is dispensed through the gun is a corresponding amount melted back upstream from the gun. If little or no molten material is dispensed from the gun, little or no material is melted in the system. Alternatively, though, if a large quantity of material is dispensed through the gun, a similar large quantity of material is melted to accommodate the gun.

A characteristic of the system disclosed in the above-identified application and all similar plunger type supply systems is a relatively uneven flow distribution pattern from the dispensing gun. It has therefore been one objective of this invention to even out the flow distribution pattern ejected from the nozzle of the dispensing gun of the system. This objective is accomplished and one aspect of this invention is predicated upon the insertion of a pressure regulator into the molten material flow stream between the melting zone and the dispensing gun. This regulator has the effect of evening out pressure variances attributable to the plunger supply system and that in turn has the effect of evening out the flow pattern ejected from the dispensing gun.

Still another objective of this invention has been to provide an improved control for a reciprocating plunger type of hot melt dispensing system. In the above-identified application, there is disclosed a control circuit operable to recycle the supply plunger or ram each time that a product is inserted and removed from adjacent the dispensing nozzle of the system. While that control circuit has been found to be very well suited to the control of this system for most applications, it is prone to recycle too frequently in the case of small products or products which individually require only very small quantities of molten material. When used to apply material to this type of product, the system recycles so frequently that it chokes the melting zone by forcing too much solid material into the system without allowing ample time and pressure for the material to be moved through the melt zone.

It has therefore been another objective of this invention to provide a control circuit for a reciprocating ram type of thermoplastic supply system which cannot become choked with solid material because of too frequent recycling and which still recycles only after a product is removed from adjacent the application nozzle so that recycling of the supply ram has only minimal or no interference with the application of molten material to the product.

The control circuit which accomplishes this objective operates upon the principal of recycling the ram only after the ram has moved through approximately one half of its stroke and then only when a product is removed from adjacent the applicator gun nozzle. The system therefore is neither subject to too-frequent recycling or to having the recharge cycle interfere with the application of material to products The primary advantage of the dispensing system of this invention is that it enables thermoplastic materials to be dispensed from a high speed dispensing gun in a very uniform even flow through the gun nozzle. It also has the advantage of applying large or very small quantities of molten material to individual products without failure of the system because of too frequent recycling and with a minimum of inoperative time being required to recharge the system.

These and other objects and advantages of this invention will be more readily apparent from the following description of the drawings in which:

FIG. 2 is an enlarged cross sectional view through the pressure regulator of the system;

FIG. 3 is a diagrammatic illustration of a control circuit which controls cycling of the dispensing system;

Figure 1:
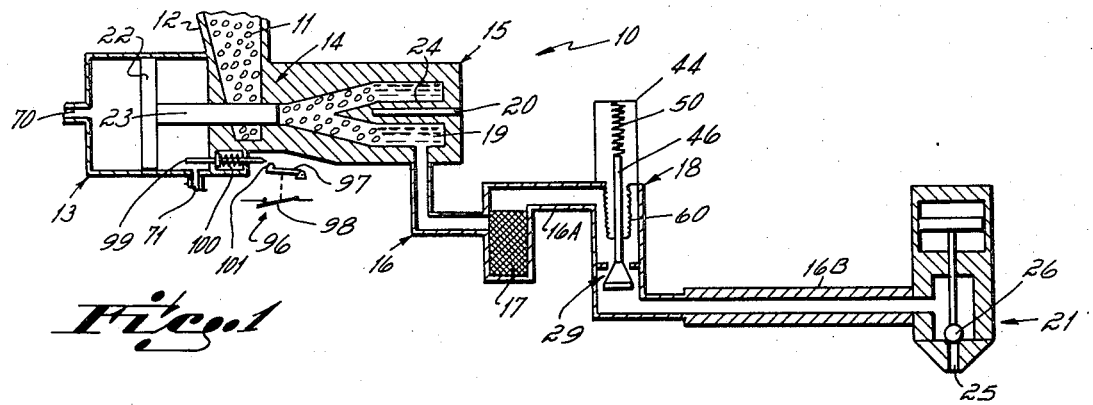
FIG. 1 is a diagrammatic cross sectional view of a dispensing system incorporating the invention of this application.

A preferred embodiment of a dispenser system 10 of this invention is diagrammatically depicted in FIG. 1. It comprises a hopper 12, a pneumatic motor 13, a supply cylinder 14, a melting and transfer barrel 15, a supply conduit 16 including a filter 17 and pressure regulator 18 for transporting molten material 19 from the discharge end of the barrel 15 to a dispenser gun 21. This system 10 is operable upon the rearward stroke of the piston 22 of motor 13, to feed a charge of solid thermoplastic material 11 downwardly from the hopper 12 into the supply cylinder 14 in front of the plunger or ram 23 of the motor 13. Upon subsequent forward movement of the ram 23, the solid material 11 is forced forwardly into the melting chamber 15 of the cylinder 14. Electrical heaters 83 (FIG. 3) located around the periphery of the barrel 15 and an electrical heater 20 located in an axially extending metal core 24 of the barrel convert the solid material 11 to molten material 19 in the course of passage over the core. The molten material is then transported in molten form out of the barrel 15 through the conduit 16 to the dispensing gun 21.

The complete system, other than the pressure regulator 18 (FIG. 2) and the control circuit (FIG. 3) is completely illustrated and described in application Ser. No. 194,862 of Robert G. Baker et al. for "Thermoplastic Dispenser System" of which this application is a continuation-in-part. Therefore, the components, other than the pressure regulator 18 and the control curcuit (FIG. 3) are neither illustrated nor described in detail herein. For purposes of completing this disclosure, the complete disclosure of application Ser. No. 194,862 is hereby incorporated by reference.

In the course of being transported through the conduit 16 from the barrel 15 to the gun 21, the molten material 19 passes through the filter 17 and the pressure regulator 18. The filter 17 per se forms no part of the invention of this application. A complete description of a suitable filter may be found in U. S. Pat. No. 3,224,590, which patent is assigned to the assignee of this application.

The pressure regulator 18 functions to effect a more uniform bead size in the molten material ejected from the nozzle 25 of the gun 21. Until the regulator 18 is placed in the molten material flow stream, the bead width varied very considerably throughout the stroke of the piston. This lack of uniformity of bead width was traced to pressure changes in the molten material at the gun 21 throughout the stroke cycles of the ram 23. This pressure variance in the absence of the regulator 18 is depicted graphically in FIG. 4 where the pressure of the molten material 19 at the gun 21 is plotted against time and against opening and closing of the nozzle 25 of the gun. As may be seen in this graph, the pressure of the molten material varies from 1,000 p.s.i. to 200 p.s.i. in a 60-second operating cycle. In point of fact, the pressure at the gun is approximately 700 p.s.i. when the valve 26 of the gun is opened. The pressure in the gun then slowly drops for approximately 15 seconds and then builds to almost 1,000 p.s.i. at the end of the ram stroke at approximately 35 seconds. In this example, the ram is not immediately recycled and the gun remains open with the result that the pressure then leaks down to approximately 200 p.s.i. at approximately 60 seconds, at which time the valve 26 of the gun is closed.

Figures 4, 5, 6, 7:
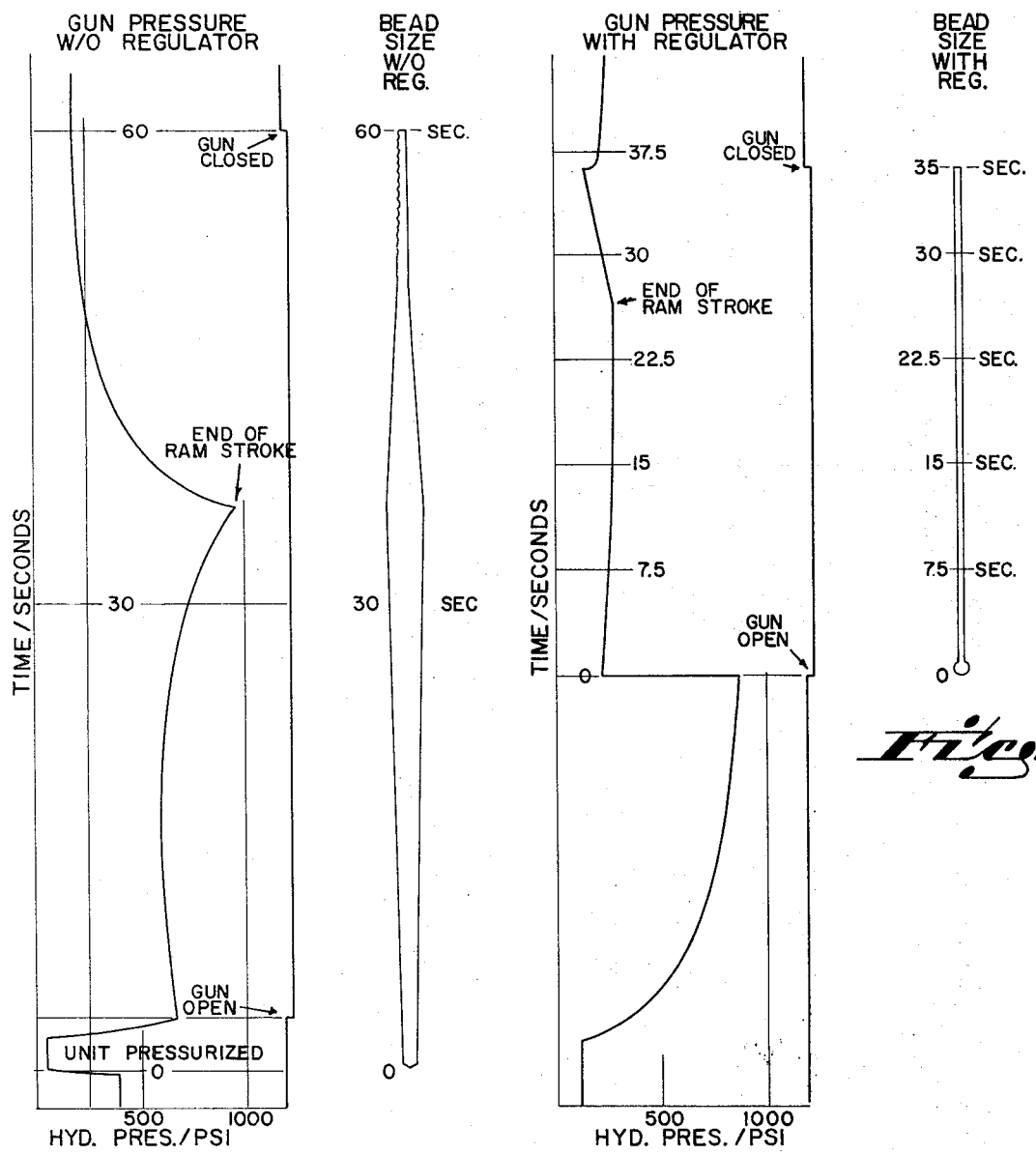
FIG. 4 is a graph of the molten material pressure in the system at the gun in the absence of the pressure regulator of the system.
FIG. 5 is a graph similar to FIG. 4 but with the pressure regulator present in the system.
FIG. 6 is a top plan view of the thermoplastic material ejected from the system absent the regulator through the time period of the graph of FIG. 4.
FIG. 7 is a top plan view similar to FIG. 6 but of the material ejected from the system while the pressure regulator was present and throughout the time period depicted in FIG. 5.

Referring now to FIG. 6, the bead size is depicted in actual size as it flowed from the orifice 25 of the gun onto a substrate throughout the time and pressure cycle depicted in FIG. 4. As may be seen in FIG. 6, the bead width varied from approximately one-eighth inch when the valve 26 was initially opened and with the pressure of the molten material at 700 p.s.i. When the pressure at the gun peaked at approximately 1,000 p.s.i. after 35 seconds, the bead width had nearly doubled to approximately one-fourth inch. The bead width then quickly decreased to approximately one-sixteenth inch as the pressure dropped and then converted into a jagged edge bead when the pressure was at 200 p.s.i. While this flow control pattern is suitable for some applications, it is unsuitable for many other applications.

To minimize or eliminate this great variance in bead width throughout the cycle of the system 10, the system depicted in FIG. 1 includes the pressure regulator 18. This regulator 18 is illustrated in detail in FIG. 2.

Referring now to FIG. 2, it will be seen that the pressure regulator 18 comprises a regulator body 30 in the form of a sleeve mounted within a housing 31. The body 30 has a through bore 32 at one end of which there is a valve seat 33. This seat takes the form of an inwardly extending flange 34 upon which there is a shoulder 35 which defines the seat for a valve head 36. At the end opposite from the valve seat 33, the body has an outwardly extending radial flange 38 which rests upon and is sealed relative to a shoulder 39 of the housing 31.

The top of the regulator body 30 is closed by a cap 41 which has a hub section 42 extending downwardly into the bore 32 of the body. Opposite the hub 42 there is an upwardly extending extension 43 which is externally threaded to receive a pressure adjustment nut 44. An axial bore 45 extends through the cap including the threaded section 43 and the hub section 42. This bore 45 slidingly supports the valve control rod 46 of the regulator 18.

The control rod 46 terminates at one end in the flow control valve head 36 and at the opposite end in a threaded section 48. An adjustment knob 49 is threaded over the threaded end 48 of the rod. This knob controls and limits downward opening movement of the valve head 36.

The adjustment knob 49 and the attached valve control rod 46 are biased downwardly by a compression spring 50 which extends between the top of the knob 49 and the bottom of a seating ring 52. This ring rests against a spacer 53 which in turn rests against the top surface 54 of a blind hole 55 contained interiorly of the pressure adjustment nut 44.

To prevent leakage of molten material into and over the sliding surfaces of the control rod 46 and cap 41, there is a static metal bellows seal 60 located interiorly of the pressure chamber 61 of the regulator. This bellows seal is sealingly secured at one end 62 to the hub section 42 of the cap 41 and at the opposite end to a flanged section 63 of the piston rod. As a consequence of this metal bellows seal, molten material contained in the chamber 61 cannot leak back over the sliding surfaces of the control rod 46 and the rod is maintained free for axial sliding movement.

Molten material is supplied to the regulator 18 from the filter 17 through the conduit 16A, through inlet ports 65 in the regulator body 30 into the pressure chamber 61 of the regulator. The valve 29 of the regulator is initially open as a consequence of the compression spring 50 biasing the valve head 36 to an open condition. It remains open until such time as the pressure downstream from the valve in conduit 16B reaches the preset pressure determined by the setting of the pressure adjustment knob 44. When this pressure is reached, as for example, at 250 p.s.i., the force of the material acting upon the lower surface 66 of the valve head 36 causes the valve 29 to close.

In practice, the area of the end surface 67 of the bellows 60 is chosen to exactly match the effective surface 68 of the valve head 36 which is subject to the pressure contained in the chamber 61. This matching of areas of these oppositely facing surfaces in the chamber 61 results in there being no net force applied to the piston rod 46 and the valve head 36 as by the fluid pressure contained in the chamber 61. Consequently, the force acting to close the valve 29 against the bias of the spring 50 is equal to the pressure in the conduit 16B multiplied by the area 66 of the valve head 36. This force can be adjusted and changed by varying the pressure setting of the pressure adjustment knob 44.

In FIG. 5 there is illustrated the pressure variance achieved in the conduit 16B at the gun 21 with the regulator in the stream, and in FIG. 7 there is illustrated the resulting bead width derived from the gun nozzle throughout the pressure cycle depicted in FIG. 5. Referring first to FIG. 5, the pressure at the gun is again plotted against time on the left hand ordinate of the graph and against the gun valve 26 opening and closing on the right hand ordinate. As may be seen in this figure, the pressure at the gun builds up to approximately 750 p.s.i. during the stroke of the ram 23 until such time as the gun is opened. This pressure buildup at the gun occurs because of leakage around the valve 29 of the pressure regulator so long as the valve 26 of the gun is maintained closed.

When the valve 26 of the gun is opened at time 0, the pressure at the gun instantly drops to the regulated pressure as determined by the pressure setting of the nut 44 of the regulator, 250 p.s.i. in this example. Throughout the stroke of the ram while molten material is being ejected through the open valve and orifice 25 of the gun, the pressure of the molten material in the conduit 16B varies by approximately 50 p.s.i. but it reamins on a substantially flat curve. At the end of the ram stroke, after approximately 25 seconds, and while the valve 26 of the gun remains open, the pressure tails off prior to closing of the gun flow control valve 26.

Referring now to FIG. 7, it will be seen that the width of the bead ejected through the orifice 25 of the gun throughout the full 35-second cycle depicted in FIG. 5 remains substantially uniform. In fact, when the bead was actually measured, it was found to vary by no more than one thirty-second of an inch throughout this complete time span and pressure cycle. This variance is well within most aplication tolerances for bead width.

In operation, the hopper 12 is filled or charged with pellets 11 of solid thermoplastic material. In the preferred embodiment pellets of thermoplastic material are utilized to charge the hopper, but the thermoplastic material could be in the form of granules or even of solid bars which sequentially move through a magazine. Irrespective of the form in which the solid material is supplied to the hopper, it moves through the hopper into the area immediately in front of the ram 23. At the start of a system cycle and before the electrical controls are turned on, an air pressure source (not shown) is connected to a port 71 of the pneumatic motor 13 and a port 70 is connected through a solenoid 90 oeprated valve (not shown) to exhaust or atmosphere so that the piston is in its rearwardmost position.

After the hopper has been filled with material, the machine is turned on by actuating the control circuit depicted in FIG. 3. Turning on the machine results in closing of a circuit breaker 80 and completion of an electrical control circuit to a light 81 (indicating that the machine is turned on).

Closing of the circuit breaker 80 also completes circuits to a manifold heater 82, the core heater 20, a barrel heater 83, a hose heater 94, and a gun heater 85 through the respective thermostat switches 73, 74, 75, 76 and 77 associated with each of the heaters. These thermostats are preset to a temperature of approximately the melting temperature of the thermoplastic material to be dispensed through the system. The barrel and core heaters may be set to a temperature slightly in excess of the melting temperature, and the hose gun and manifold heaters may be set to a temperature slightly less than the melting temperature but above the freezing temperature at which the termoplastic material reconverts to a solid. In the preferred embodiments there are indicator lights connected in parallel with the manifold, core and barrel heaters to indicate that those heaters are still being heated. Normally, the machine cycle would not be started until these lights go out, indicating that the thermostats associated with each of these heaters have opened and that the heaters are at temperature.

When the power to the circuit is turned on by closing of the circuit breaker or switch 80, a piston control cycle is initiated through a control circuit to the solenoid 90. This circuit initially energizes the solenoid to initiate movement of piston 22 through a normally closed manual cycle switch 91 and a normally closed contact CR4-2 of relay CR4. Simultaneously, the relay CR4 is energized through a normally closed product detection switch 92. Another control relay CR5 is also immediately energized through the manual cycle control switch 91, a lead 93 and a switch 94 which is closed so long as the pneumatic motor piston 22 is in its leftmost position (FIG. 1). As soon as the relay CR5 is energized, a holding circuit is pulled in to the solenoid 90 through normally open contacts CR4-1 and CR5-1. A holding circuit to the relay CR5 also pulls in through the manual cycle switch 91, lead 93, and the normally open contacts CR4-3 and CR5-2. The piston 22 starts and continues to move until the molten material in the barrel is fully pressurized. The system is now ready for application of molten material to a product or article by application through the guns 21.

When a product or article is located adjacent the nozzle of the guns 21, the article contacts and opens the normally closed product detection switch 92. As explained more fully hereinafter, an interlock switch 96 connected in parallel with the product detection switch 92 then maintains the relay CR4 energized until the ram 23 has moved through one half its full stroke. Assuming that it has moved through one half its full stroke so that the switch 96 is open, opening of the switch 92 has the effect of dropping out the relay CR4 as well as the holding circuits to the solenoid 90 and relay CR5 through opening of the contacts CR4-1 and CR4-3 of relay CR4. The solenoid 90 remains energized, though, through normally closed contact CR4-2 so that the molten material remains pressurized after insertion of a product beneath the nozzles of the guns 21.

After the molten material has been dispensed through the guns onto the article, the article is removed, thereby closing the normally closed product detection switch 92 and energizing the relay CR4. This has the effect of opening all circuits path to the solenoid 90 so that the solenoid is thereby de-energized. When the solenoid is de-energized, the right side of the piston 22 is connected to the source of air pressure and the left side is connected to exhaust. The piston therefore moves rearwardly until the piston 22 reaches the rear end of its stroke and contacts the plunger of switch 94. When the switch 94 closes, a circuit is completed to the relay CR5 through the manual cycle switch 91, lead 93 and the switch 94. Closing of this relay again completes a circuit to the solenoid 90 through the contacts CR4-1 and CR5-1 so that the piston 22 again moves rightwardly to pressurize the molten material preparatory to insertion of the next article beneath the gun nozzles.

In the above-identified application, of which this application is a continuation-in-part, the circuit was such that every time a product was inserted to actuate the product detection switch 92 and then removed, the ram 23 automatically recycled. With the addition of the interlock switch 96 in parallel with the product detector switch 92, the ram does not recycle until it has passed through one half of its stroke to open the normally closed interlock switch.

Functionally, the interlock switch 96 serves to eliminate too frequent recycling of the ram 23. In practice, it has been found that if very small quantities of molten material are dispensed onto each article, the ram recycles so frequently in relation to the time period during which it applies pressure to the solid material to force it through the melting zone that the system becomes choked with solid thermoplastic material. The interlock switch prevents this choking by recycling the ram only after it has moved through a predetermined portion of its full stroke, approximately one half the stroke in the preferred embodiment.

Referring to FIG. 1, it will be seen that the interlock switch 96 comprises an actuating finger 97 operatively connected to a normally closed blade 98 of the switch 96. This actuator finger 97 is spring-biased to a position in which it holds the blade 98 closed. To open this switch, there is a plunger 99 located in the path of movement of motor piston 22. After the ram 23 has moved through approximately one half of its stroke, the piston 22 contacts the end of the plunger and forces it forwrdly against the bias of a spring 100 into contact with cam 101 located on the end of the finger 97. Contact of the plunger 99 with the cam 101 causes the finger 97 to open the blade 98 of the switch 96.

As an example and with reference to FIG. 5, if a product is inserted that opens the gun at time = zero and the product is removed to close the gun again at time = 7 ½ seconds, the ram would not be halfway down and it would not recycle. The pressure in the gun then slowly builds up again to approximately 750 p.s.i. because of leakage around the regulator valve seat 35. Then if another product is inserted, the product detection switch opens and when the ram passes the halfway point in its own stroke, the ram interlock switch 96 is open so that immediately upon removal of the product, the ram recycles. It would not recycle when the ram reached the end of its stroke if there were still a product triggering the product detection switch 92.

As another example and again with reference to FIG. 5, assume that there is a 30-second charge during the course of the stroke of the ram. If it took 14 seconds to coat the first product, presumably the ram would not have been retriggered, but the second product would use an additional 14 seconds, making 28 seconds, which is more than half the total volume and stroke of the ram. Therefore, removal of the product would trigger the ram. If in the same example, a product were in the device for 16 seconds, the ram would recycle upon removal of the product.

While we have described only a single preferred embodiment of our invention, persons skilled in the art to which this invention pertains will readily appreciate numerous changes and modifications which may be made without departing from the spirit of our invention. Therefore, we do not intend to be limited except by the scope of the following appended claims.

Having described our invention, we claim:

1. A system for dispensing molten thermoplastic material comprising a cylinder and a barrel, said cylinder being in fluid communication with said barrel, said barrel including a melting zone, a molten material transfer zone, and an outlet port, a heating chamber located in said barrel, at least one heater operable to heat said chamber to at least the melting temperature of said thermoplastic material, a piston mounted to reciprocate in the bore of said cylinder, a motor mounted rearwardly of said cylinder and operable to effect reciprocation of said piston, a dispenser including an inlet port, a flow control valve, and an outlet orifice, conduit means connecting the inlet port of said dispenser to the outlet port of said barrel, means including a pressure regulator in said conduit means for maintaining a uniform even rate of flow of molten material from the outlet orifice of said dispenser when said valve is open, said pressure regulator comprising a body having a pressure chamber therein, a valve rod movable within said chamber and having a valve element operatively connected thereto for opening and closing said pressure chamber, and a metal bellows seal connected at one end to said body and at the other end to said rod so as to effect a static seal between said rod and body.

2. The dispensing system of claim 1 in which said pressure regulator includes a spring for biasing said valve element to an open position, and means for adjusting said spring bias to vary the pressure required to effect closing of said pressure chamber by said vale element.

3. A system for dispensing molten thermoplastic material comprising a cylinder and a barrel, said cylinder being in fluid communication with said barrel, said barrel including a melting zone, a molten material transfer zone, and an outlet port, a heating chamber located in said barrel, at least one heater operable to heat said chamber to at least the melting temperature of said thermoplastic material, a piston mounted to reciprocate in the bore of said cylinder, a motor mounted rearwardly of said cylinder and operable to effect reciprocation of said piston, a dispenser including an inlet port, a flow control valve, and an outlet orifice, conduit means connecting the inlet port of said dispenser to the outlet port of said barrel, means including a pressure regulator in said conduit means for maintaining a uniform even rate of flow of molten material from the outlet orifice of said dispenser when said valve is open, said pressure regulator comprising a body having a pressure chamber therein, a valve rod movable within said chamber and having a valve element operatively connected thereto for opening and closing said pressure chamber, and a spring for biasing said valve rod to a predetermined position within said pressure chamber.

4. The dispensing system of claim 3 which further includes means for controlling reciprocation of said piston, said control means being operable to effect rearward and then forward recharging movement of said piston in response to removal from adjacent said dispenser gun outlet orifice of an article to which material has been applied.

5. The dispensing system of claim 4 in which said control means includes interlock means for preventing rearward movement of said piston in response to removal of an article from adjacent said orifice unless said piston has previously moved through a predetermined portion of its forward recharging movement.

6. The dispensing system of claim 4 in which said piston reciprocation motor comprises a pneumatic motor and in which said control means includes a solenoid operated valve and an electrical circuit including a product detection switch operable to detect removal of an article from adjacent the outlet orifice of said dispenser gun.

7. The dispensing system of claim 6 in which said control means includes interlock means for preventing rearward movement of said piston in response to removal of an article from adjacent said orifice unless said piston has previously moved through a predetermined portion of its forward recharging movement, said interlock means including a piston movement controlled interlock switch connected in parallel with said product detection switch.

8. A system for dispensing molten thermoplastic material comprising a hopper, a cylinder, and a barrel, said cylinder being in fluid communication with said barrel and sealingly connected to the rearward end thereof, said barrel including a melting zone, a molten material transfer zone, and an outlet port, said outlet port being located adjacent the front of said barrel, a heating chamber located in said barrel, said chamber including a heated core mounted in said chamber in radially spaced relation to the inside wall of said barrel, a piston mounted to reciprocate in the bore of said cylinder, a motor mounted rearwardly of said cylinder and operable to effect reciprocation of said piston, said hopper being operable each time said piston moves rearwardly in said barrel to deliver a charge of solid material into said cylinder between said piston and said heating chamber such that the material is forced by said piston forwardly successively into and through said cylinder and said barrel upon forward movement of said piston, a dispenser gun including an inlet port, a flow control valve, and an outlet orifice, fluid conduit means connecting the inlet port of said gun to the outlet port of said barrel, means including a pressure regulator in said fluid conduit means for maintaining a substantially constant pressure of said molten material in said gun throughout the forward stroke of said piston so as to maintain a uniform flow of molten material from the outlet orifice of said gun when said valve is open, said pressure regulator comprising a body having a pressure chamber therein, a valve rod movable within said chamber and having a valve element operatively connected thereto for opening and closing said pressure chamber, and a spring for biasing said valve rod to a predetermined position within said pressure chamber.

9. A system for dispensing molten thermoplastic material comprising a cylinder and a barrel, said cylinder being in fluid communication with said barrel, said barrel including a melting zone, a molten material transfer zone, and an outlet port, a heating chamber located in said barrel, at least one heater operable to heat said chamber to at least the melting temperature of said thermoplastic material, a piston mounted to reciprocate in the bore of said cylinder, a motor mounted rearwardly of said cylinder and operable to effect reciprocation of said piston, a dispenser including an inlet port, a flow control valve, and an outlet orifice, conduit means connecting the inlet port of said dispenser to the outlet port of said barrel, and means for controlling reciprocation of said piston, said control means being operable to effect rearward and then forward recharging movement of said piston in response to removal from adjacent said dispenser gun outlet orifice of an article to which material has been applied, said control means further including interlock means for preventing rearward movement of said piston in response to removal of an article from adjacent said orifice unless said piston has previously moved through a predetermined portion of its forward recharging movement.

10. The dispensing system of claim 9 in which said control means includes a product detection switch operable to detect removal of an article from adjacent the outlet orifice of said dispenser gun.

11. The dispensing system of claim 10 in which said interlock means includes a piston movement controlled interlock switch connected in parallel with said product detection switch.

12. A system for dispensing molten thermoplastic material comprising a hopper, a cylinder, and a barrel, said cylinder being in fluid communication with said barrel, said barrel including a melting zone, a molten material transfer zone, and an outlet port, said outlet port being located adjacent the front of said barrel, said melting zone of said barrel including a heated metallic core mounted in said zone in radially spaced relation to the inside wall of said barrel, a piston mounted to reciprocate in the bore of said cylinder, a motor mounted rearwardly of said cylinder and operable to effect reciprocation of said piston, said hopper being operable when said piston moves rearwardly in said barrel to deliver a charge of solid material into said cylinder between said piston and said heating chamber such that the material is forced by said piston forwardly successively into and through said cylinder and said barrel upon forward movement of said piston, a dispenser gun including an inlet port, a flow control valve, and an outlet orifice, conduit means connecting said dispenser gun inlet port to said barrel outlet port, means for controlling reciprocation of said piston, said control means being operable to effect rearward and then forward recharging movement of said piston in response to removal from adjacent said dispenser gun outlet orifice of an article to which material has been applied, said control means further including, interlock means for preventing rearward movement of said piston in response to removal of an article from adjacent said orifice unless said piston has previously moved through a predetermined portion of its forward recharging movement.

13. The dispensing system of claim 12 in which said control means includes a product detection switch operable to detect removal of an article from adjacent the outlet orifice of said dispenser gun.

14. The dispensing system of claim 13 in which said interlock means includes a piston movement controlled interlock switch connected in parallel with said product detection switch.

* * * * *